United States Patent [19]
Dose

[11] 3,945,514
[45] Mar. 23, 1976

[54] GRIPPING APPARATUS OF A LIFTING DEVICE, ESPECIALLY IN A CORE REACTOR FOR SETTING DOWN AND LIFTING FUEL ELEMENTS AND FUEL RODS

[75] Inventor: Gerhard Dose, Laudenbach, Bergstrasse, Germany

[73] Assignee: Fried, Krupp Gesellschaft mit beschrankter Haftung, Essen, Germany

[22] Filed: Feb. 15, 1974

[21] Appl. No.: 443,111

[30] Foreign Application Priority Data
Feb. 19, 1973   Germany................ 2308131

[52] U.S. Cl. ................ 214/27; 176/30; 214/18 N; 294/86 A
[51] Int. Cl.² ................ G21C 19/10
[58] Field of Search ........ 214/18 N, 27, 658; 212/129; 294/86 A; 176/30, 36 C

[56] References Cited
UNITED STATES PATENTS
3,691,011   9/1972   Kruger et al.................. 214/18 N X
3,768,668   10/1973  Schukei ........................ 214/18 N X Primary Examiner—Robert G. Sheridan
Attorney, Agent, or Firm—Walter Becker

[57] ABSTRACT

A gripping and lifting device, especially for use with fuel elements and control rod means in a nuclear core reactor in which a carriage having a winch thereon supports a mast beneath the carriage in which is slidable a tubular body within which, in turn, is slidable a housing. Cables lead from the winch to the first body for vertical movement thereof while the housing has limited axial movement in the aforementioned body. On the lower end of the housing are two gripper devices, one for engagement with the control rods and the other for engagement with the fuel element. Separate actuators are provided for the two grippers and sensing devices are included in the structure for sensing the positions of the grippers. A feature of the arrangement is that when the body is elevated and the housing moves downwardly therein to a stopped position, the gripper for the fuel element is locked in its respective position.

10 Claims, 9 Drawing Figures

GRIPPING APPARATUS OF A LIFTING DEVICE, ESPECIALLY IN A CORE REACTOR FOR SETTING DOWN AND LIFTING FUEL ELEMENTS AND FUEL RODS

In core reactors, there is encountered the problem of exchanging the rod-shaped fuel elements as well as the blind, control, trim, poisoning and control rods in a manner which is not dangerous to the operator. To this end, it has been suggested according to U.S. Pat. No. 3,768,668 Schukei issued Oct. 30, 1973 to equip a charging device intended for a core reactor and provided with a vertically movable double grab, with an independently operable control rod grab and with a fuel element grab. According to this patent, in a guiding mast which has its upper end rotatably journaled on the charging device for rotation about its vertical axis there is vertically displacably guided a centering bell. Within this bell there is vertically displaceably guided a control rod guiding insert with a fuel element gripper head at its lower end. Furthermore, within the control rod guiding insert there is a control rod gripper linkage guided for telescopic movement in vertical direction. Said linkage is suspended on two cables of a winch which is rotated when rotating the guiding mast. The lifting of the control rod guiding insert is effected by lifting the control rod gripper linkage after a shoulder on the control gripper head has from below engaged a flange at the upper end of the control rod guiding insert. A supporting plate which is mounted at the upper end of said control rod guiding insert will, after a certain movement in upward direction, engage from below a flange at the upper end of the centering bell. It is with this flange that the centering bell up to that time was deposited on abutments of the guiding mast. By further lifting the control rod gripper linkage and of the control rod guiding insert by means of the winch, subsequently, the centering bell is moved upwardly.

When by means of this charging device, a fuel element is to be pulled out of its jacket in the reactor core or in a bearing frame, the control rod guiding insert is, by lowering the control rod gripper linkage by means of the winch lowered until the fuel element gripper head sets open the fuel element. This takes place after the centering bell which was likewise first lowered has its upper flange resting upon the abutment of the guiding mast and after centering pins at the lower end of said centering bell have moved into bores of the adjacent fuel elements. Shortly prior to the fuel element gripper head setting down on the fuel element, the gripper pawls mounted on the burner element-gripper head are unlatched by upwardly moving a pin. Subsequently, the gripper pawls are by means of a pneumatic actuating cylinder mounted on the control rod guiding insert, brought into engagement with recesses of the fuel element head. During the start of the lifting of the fuel rod guiding insert, the gripper pawls are locked in their locking position. When the control rods are to be pulled out of a fuel element, the control rod gripper linkage is lowered further after the fuel element gripper head has set upon the head of the fuel element, until the control rod gripper head located at the lower end of said control rod gripper linkage has set upon the control rod head combining the control rods. By means of said last mentioned head the control rod gripper head is coupled to said control rod head by means of a pneumatic actuating cylinder which is located on the upper end of the control rod gripper linkage. By lifting the control rod gripper linkage by means of the winch, subsequently the control rods are pulled into the split pipes of the control rod guiding insert. The accidental disengagement of the coupling connection between the control rod gripper head and the control rod head is effected by outwardly spreading abutments (Beistellanschlaege) during the establishment of the coupling connection, which for abutments are arranged at the upper portion of the control rod gripper linkage. This spreading is effected in such a way that when lifting the control rod gripper linkage, the said abutments engage from below the flange provided at the upper end of the centering bell and by means of the weight of the centering bell lifted upwardly onto said flange are held in their spread position thereby preventing an actuation of the control rod gripper head in the sense of disengaging the clutch connection.

This construction has the drawback that when a fuel element has been lowered into the core or in a mounting the control rods are pulled out of the fuel element, this cannot be effected directly subsequent to the setting down of the fuel element-gripper head onto the fuel element head. It is rather necessary for this purpose first to further lower the control rod gripper linkage until the control rod gripper head has set upon the control rod head of the control rods in the fuel element.

Inasmuch as furthermore the control rods when being pulled out of the fuel element enter the control rod guiding insert, they can subsequently not without difficulties, for instance, by means of an endoscope, be inspected. It is rather necessary that after the centering bell has been pulled far enough upwardly into the guiding mast and has been deposited on pivotal abutments within said guiding mast, the control rods have to be lowered by means of the winch. After the control rod guiding insert rests by means of abutments on abutments provided at the lower end of the centering bell, the control rods extend downwardly from the control rod guiding insert. During this operation, the spread abutments move away from the upper flange of the centering bell so that the said abutments no longer serve as safety means for the coupling connection between the control rod gripper head and the control rod head.

It is an object of the present invention to provide a gripping apparatus of a lifting device for long extending bodies which pertain to two different groups with different functions, especially in a core reactor, for depositing and picking up of fuel elements and rods, said gripping apparatus being designed as integrated gripper in such a way that a simple and thus less expensive construction will be obtained which will not be liable to relatively frequent disorders and will bring about a considerable reduction in time heretofore required, especially when pulling rods subsequently to the depositing of a fuel element.

These and other objects and advantages of the invention will appear more clearly from the following specification, in connection with the accompanying drawings, in which.

The invention brings about the advantage that the telescope-like guiding between a control rod gripper linkage and a control rod guiding insert carrying a fuel element gripper head will be avoided so that a considerable simplification in the construction will be obtained. The checking of the pulled fuel elements and rods will be facilitated. At any rate, the coupling connections between the fuel element grippers and the fuel element suspended thereon as well as between the rod-gripper and the rod head suspended thereon will be reliably assured. Furthermore, a turning of the winch during the turning of the guiding mast will be avoided.

A further advantage of the device according to the invention is seen in the fact that the various positions of the two grippers are safely indicated by remote indication to the operator. In particular, the feeler pin which is slidably guided in a vertical bore extending through the piston and the piston rod of the power device pertaining to the rod-gripper, indicates toward the outside whether the control rod head is disengaged from the burner element head and is coupled to the rod-gripper or vice versa.

Referring now to the drawings in detail, as will be seen therefrom, a guiding mast 2 extends vertically downwardly from the carriage 1 of the charging device. This mast 2 has its upper end by means of a flange and through the intervention of a bearing 3 rotatably resting on the platform of the carriage. The said upper end is rotatable about a vertical axis 4. The drive for rotating the guiding mast 2 is effected by means of a turning mechanism provided in the carriage 1. This turning mechanism comprises a motor 5 and a pinion 6 which meshes with a gear ring at the above mentioned flange of the guiding mast. If desired, also a frictional drive may be used.

Mounted on the carriage 1 is a drum 7 of a winch. From this drum, two cables 8 which are parallel to each other lead to traversing rollers 9 or bolts on which are suspended two racks 10. A plurality of pinions 11 mesh with the teeth of said racks which teeth face each other. The shafts of said pinions 11 are arranged in a pot-shaped supporting body 12 which receives the racks 10. The supporting body 12 thus, through the intervention of racks 10, is suspended on the cables 8 of the winch while by means of the pinions 11 a load equalization is effected between the two cables 8.

Within the hollow guiding mast 2 which may, for instance, have a square-shaped cross section there is in vertical direction displaceably guided a hollow gripper body 13 which may likewise have a square cross section. The gripper body 13 is guided by means of rollers 14 which are arranged on the inner side of the guiding mast 2. The gripper guiding body 13 is supported by the supporting body 12 by having an upper end wall 15 with the edge of a circular opening resting on the upper rim portion of the supporting body 12 through the intervention of the axial pressure bearing 16.

Within the gripper body 13, a gripper housing 17 is vertically displaceably guided, said housing 17 likewise having a square-shaped cross section. This displacement is possible by means of guiding strips 18, 19 which are arranged on the gripper housing 17 or on the gripper body 13. The gripper housing 17 is closed at its top by a plate 20 which latter is provided with a collar 21 projecting over the side walls of the gripper housing 17. When the gripper body 13 is lifted, strips 22 engage from below the collar 21. These strips 22 are arranged on the side walls of the gripper body 13 and more specifically on the inner sides thereof so that the gripper housing 17 will be supported by the gripper body 13 when the gripper housing 17 is lifted. Gripper pawls 23 which in pairs are located opposite each other are by means of bolts 24 pivotable about horizontal axes and are located at the lower end of the gripper housing 17. The lower ends of the gripper pawls 23 are designed in the form of inwardly directed hooks equipped at their ends with upwardly directed noses 25. The gripper links 23 are designed as angle levers with legs 26, which at the level of the bolts 24 are approximately horizontally directed inwardly. Rods 27 engage legs 26 of two oppositely located gripper links 23. These rods 27 extend through openings in a lower platform 28 of the gripper housing 17 and further extend upwardly to the end of a traverse 29. The center of the traverse 29 is engaged by a piston rod 30 of a pneumatic power operable device, said piston rod 30 extending through a bore in the plate 20. The pertaining piston 31 is guided in a cylinder 32 mounted on plate 20. The piston rod 30 continues from the piston 31 upwardly in the form of a rod 33 which passes through a bore in an upper end wall of the cylinder 32. A helical spring 34 presses from below against a collar provided at the upper end of the rod 33. Spring 34 is mounted on the upper end wall of the cylinder 32. It will be appreciated that spring 34 will thus have the tendency to urge the rod 33 and thereby the piston rod 30 and the traverse 29 with the rods 27 to move in upward direction which means that the spring 34 tends to pivot the gripper pawls 23 into the coupling position shown in FIGS. 1 and 2 in which the hook-shaped ends of the gripper pawls 23 extend through cutouts 35 in extensions on the head 36 of a fuel element.

The pivoting of the gripper pawls 23 into coupling position is brought about on the other hand, primarily by means of compressed air which may be fed through a conduit 37 into that chamber of the cylinder 32 which is located below the piston 31, whereas air is displaced through a conduit 38 from the cylinder above the piston 31.

Figure 3:
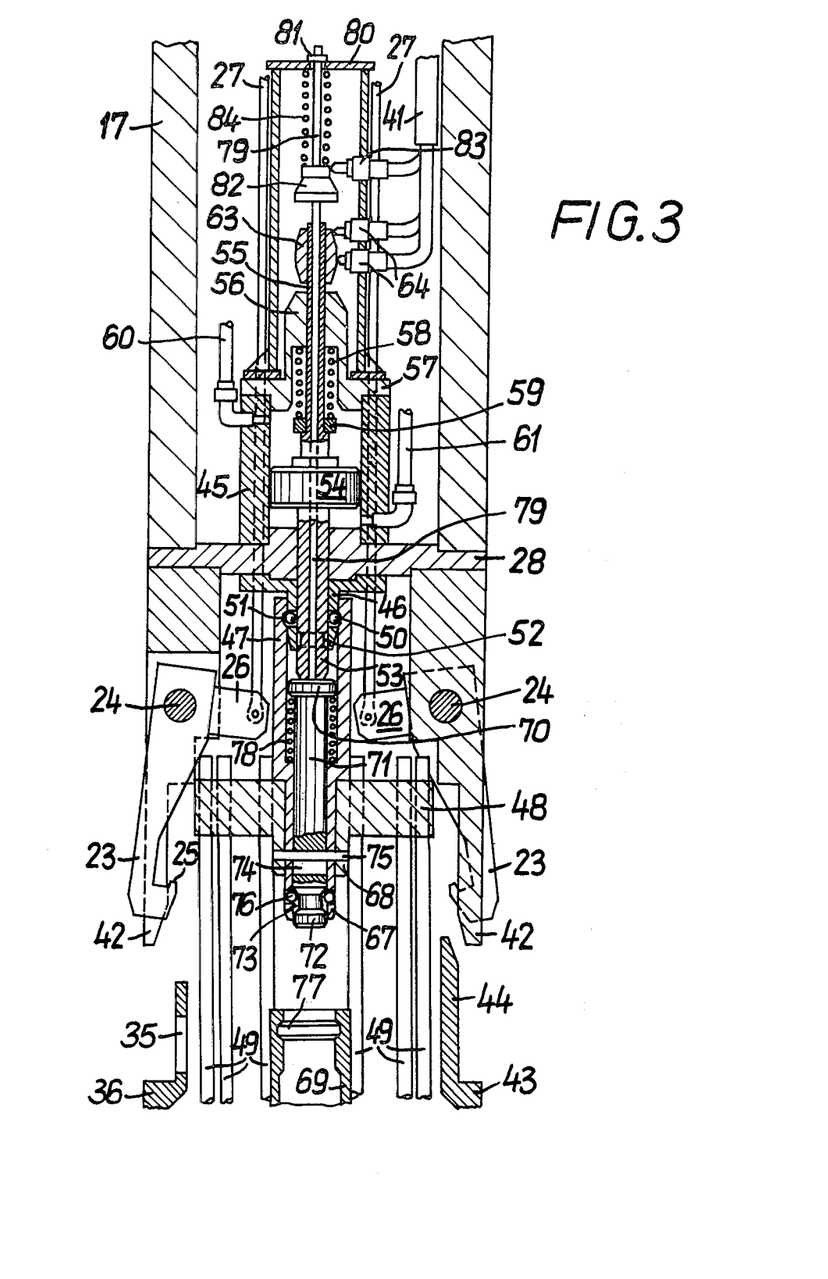

When the coupling connection between the gripper housing 17 and the head 36 of the fuel element is to be disengaged, the piston 31 is moved downwardly against the thrust of spring 34 in order to permit outward pivoting of the gripper pawls 23 according to FIG. 3. This is effected by means of compressed air which is fed through a conduit 38 into the cylinder chamber provided above the piston 31. At the same time, air escapes from the cylinder chamber below the piston through the conduit 37. In this connection, care is to be taken that the respective escaping air will still be under a certain overpressure in order to prevent water in case of a leak from entering the conduits 37, 38.

At the upper end of the rod 33 there is provided a cam piston 39, the lateral profile surface of which is engaged by the horizontally movable pins of two limit feelers 40. These feelers 40 are arranged in a holder on cylinder 32 and have electrical conductors connected thereto which in a cable 41 lead upwardly. Cable 41 extends through the upper face wall 15 of the gripper body 13 and from there extends to the carriage 1 and a control station. In this control station the position of the piston 31 is indicated so that is can be ascertained whether the gripper pawls 23 are in closing or opening position.

The gripper housing 17 has fingers 42 which extend downwardly and by means of which the gripper housing can be placed upon a collar 43 of the fuel element head 36. The gripper housing 17 is centered relative to the head 36 by fingers 44 which protrude upwardly from the collar 43 and which rest against the inner surfaces of the fingers 42.

The cylinder 45 of a pneumatic operable power device for actuating the rod gripper is mounted on the lower platform 28 of the gripper housing 17. This rod gripper comprises a cylindrical coupling pivot 46 which is axis-centrally mounted on the bottom side of the platform 28 and extends downwardly. Pivot 46 is, in conformity with the showing of FIGS. 1–3, slipped from above fitting into a bore of a sleeve 47 which extends upwardly from a plate 48 which forms the rod head. In plate 48 and distributed in a diamond-like manner are the upper ends of rods 49 (control rods, trim rods, poisoning rods, or regulating rods) which have been inserted into the bores of the fuel element in conformity with FIGS. 1 and 2.

The rod gripper is, for purposes of establishing a coupling connection between the gripper housing 17 and the rod head 48 provided with a ring of supporting balls 50 which are located in radial bores of the coupling pivot 46. In the positions which the gripper housing assumes in FIGS. 1, 2 and 3, an annular groove 51 in sleeve 47 is located opposite said radial bores. On the other hand, opposite the radial bores containing the balls 50, according to the setting shown in FIGS. 1 and 2 of the power device pertaining to the rod gripper there is located an annular groove 52. The annular groove 52 is located in a guiding rod 53 which is displaceably guided in a central bore of the coupling pivot 46. The guiding rod 53 forms the continuation of the piston rod which starts from the piston 54 in cylinder 45 and passes through a bore of the platform 28.

From piston 54 a rod 55 extends upwardly which is passed through a bore in an extension 56 of a lid 57 which closes the cylinder 45. A helical spring 58 which extends around the rod 55 is located in a bore of the extension 56. This helical spring exerts a downwardly directed pressure upon a collar 59 on rod 55. Spring 58 aids the action of the compressed air which may be introduced through a conduit 60 into the chamber of cylinder 45, said chamber being located above the piston 54. Simultaneously, air escapes from the chamber below the piston 54 through a conduit 61. For purposes of lifting the piston 54 against the thrust of spring 58, compressed air may, through conduit 61, be introduced into the cylinder chamber below the piston 54. Simultaneously, air escapes from the cylinder chamber above the piston 54 through the conduit 60. As in this instance, care has been taken that the respectively escaping air is still under an overpressure. The conduits 60, 61 are together with the conduits 37, 38 combined into a strand 62 which passes through the upper end wall 15 of the gripper 13 to the carriage 1 and to a non-illustrated compressed air storage and control device. At that end of the rod 55 which protrudes beyond the extension 56 there is provided a cam piston 63 having its lateral profile surface engaged by the displaceable pins of two limit feelers 64 which are arranged in a frame 65 connected to the lid 57. Connected to these pins are electric conductors which are bound into the cable 41 which latter passes through plate 20.

For purposes of establishing a coupling connection between the rod head 48 and the fuel head 36 there is provided a cylindrical pivot 67 which forms the continuation of sleeve 47 and passes through a bore in plate 48 and through an extension 68 which extends from plate 48 in downward direction. When the gripper housing 17 occupies the position illustrated in FIGS. 1 and 2, the extension 68 rests on a sleeve 69 which extends upwardly from the fuel element head 36. The cylindrical pivot 67 has, in such an instance, its lower end fittingly inserted into the bore of sleeve 69, said lower end protruding in downward direction from the extension 68.

Figure 1:
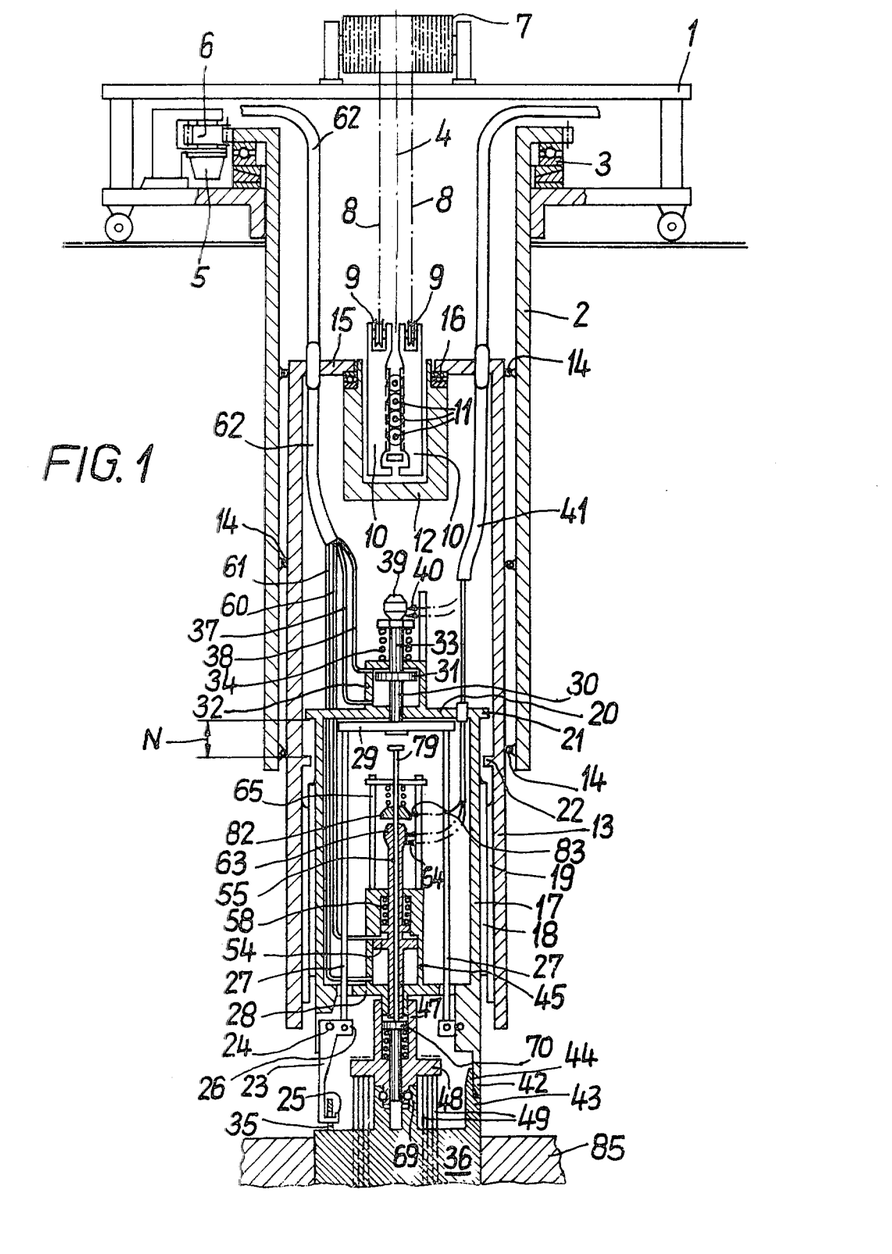
FIG. 1 is an axial section through a charging device for fuel elements and rods with a burner element head and a control rod.
Figure 2:
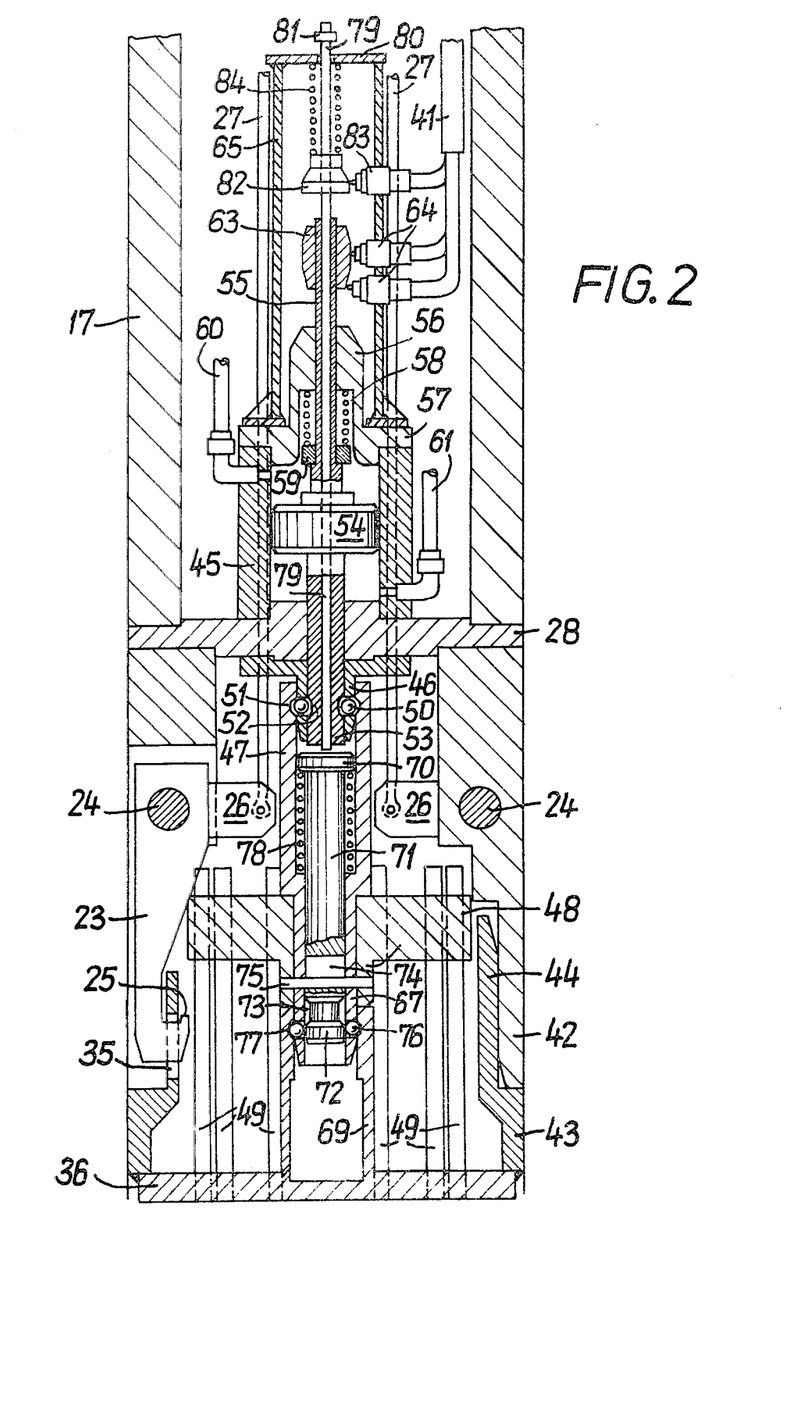
FIGS. 2 and 3 illustrate in axial section through parts of said charging device of FIG. 1 in two different positions respectively and on a larger scale than that of FIG. 1.

In the bore of sleeve 47, which bore receives the coupling pivot 46 there is guided a piston 70 followed in downward direction by a cylindrical guiding rod 71. Guiding rod 71 is displaceably guided in a downwardly extending narrower bore of the cylindrical pivot 67, said last mentioned bore following the bore in sleeve 47. Pivot 67 is, in the vicinity above its lower end 72, provided with an annular groove 73 and above the latter has a slit 74. Through this slit, a bolt 75 passes which fits tightly in bores of the cylindrical pivot 67 and of the extension 68. That end of the pivot 67 which protrudes downwardly from the extension 68 has radial bores provided with supporting balls 76. Assuming that the gripper housing 17 and the rod head 48 occupy the positions illustrated in FIGS. 1 and 2, the said radial bores have located opposite thereto an annular groove 77 of the sleeve 69. On the other hand, with the position of the parts 17 and 18 located as shown in FIGS. 1 and 2, said radial bores are closed by the lower end 72 of the guiding rod 71 which has been moved upwardly as far as possible. With the lower end position of guiding rod 71, as illustrated in FIG. 3, the radial bores have located opposite thereto the annular groove 73. A pressure spring 78 located in the bore of sleeve 47 has the tendency to move the piston 70 as far as possible in upward direction.

The guiding rod 53, the piston 54, and the rod 55 have an axis-central continuous bore. In this bore there is displaceably guided a feeler pin 79, the upper end of which projects considerably beyond the bar 55 and is passed through a bore in an upper cover plate 80 of the frame 65. That end of the feeler pin 79 which projects beyond the cover plate 80 has an abutment 81. A cam piston 82 is mounted on the feeler pin 79 below the cover plate 80. The later profile surface of cover plate 80 is engaged by a horizontally displaceable pin of a limit feeler 83 which is located in the frame 85. At the limit feeler 83 there originates an electric conductor which is wound into the cable 41. A helical spring 84 which rests against the cover plate 80 and has the tendency to move the feeler pin 79 downwardly, acts upon a cam piston 82. The feeler pin 79 will thus always have its lower end rest against the piston 70.

FIGS. 1 and 2 illustrate the instance in which the gripper housing 17 rests with its fingers 42 on the fuel element head 36 and is coupled thereto by the gripper pawls 43. Accordingly, the piston 31 of the power device pertaining to the fuel element gripper is by compressed air from conduit 37 and by spring 34 pushed upwardly as far as possible.

In this connection it is assumed that the rod head 48 is coupled to the fuel element head 36. This is actually so, according to FIG. 2, the piston 54 of the power device pertaining to the rod gripper is by compressed air from conduit 61 pushed upwardly against the resistance of spring 58 and consequently, also piston 70 is by spring 48 moved into the upper end position determined by the bolt 75. In this upper end position, the lower end 72 of the guiding rod 71 prevents the supporting balls 46 from leaving the annular groove 77 of sleeve 69.

In conformity with the upper position of piston 54, the coupling connection between the gripper housing 17 and the rod head 48 is not yet established. It will be appreciated that the annular groove 52 of the guiding rod 53 is located opposite the radial bores of the coupling pivot 46, which radial bores contain the supporting balls 50. The annular groove 52 receives the supporting balls 50 so that they cannot engage the annular groove 51 of sleeve 47.

This condition, which means the position of piston 54 and of guiding rod 53 is through cam piston 63 and limit feelers 64 as well as the cable 41 indicated in the control panel where it is also indicated that the rod head 48 is not coupled to the gripper housing. Furthermore, the feeler pin 79 which in FIGS. 1 and 2 occupies its uppermost end position, indicates through the cam piston 82 and limit feeler 64 as well as the cable 41 to the control panel that the rod head 48 is still coupled to the fuel element head 36.

The placing of the gripper head housing 17 upon the fuel element head 36 is effected in conformity with FIGS. 1 and 2 by lowering the gripper body 13 by means of winch 7. After the gripper housing has by means of finger 42 been deposited on the fuel element head 36, the gripper body has still a certain coasting stroke, the stroke of which is indicated in FIG. 1 with the letter N. Consequently, the fuel mantle head 36 will be only under the load of the gripper housing 17 but not under the load of the gripper body 13.

In order that the fuel element together with the rods 49 inserted therein will be pulled out of its fitting 84 in the core or in a bearing frame, the gripper body 13 is lifted by means of winch 7 through the supporting body 12. If the strips 22 of the gripper body rest against the collar 21 of the gripper housing 17, the latter is lifted together with the fuel elements coupled through the cable pawls 23.

In this case it has to be assured that the coupling connection between the gripper housing and the fuel element cannot be disengaged. To this end, there is provided for instance the locking device illustrated diagrammatically in FIGS. 4, 5 and 6. According to this showing, a locking element 86 is provided on the top side of a strip 22 of the gripper body 13. Pivotally mounted on the collar 21 of the gripper housing 17 is a sector 87, said sector being pivotably about a horizontal axis and has two ratchets 88, 89 adapted to be engaged by the locking member 86. The sector 87 is through a linkage system, for instance a linking member 90 and an angle lever 91 in positive connection with the traverse 29.

Figure 4:
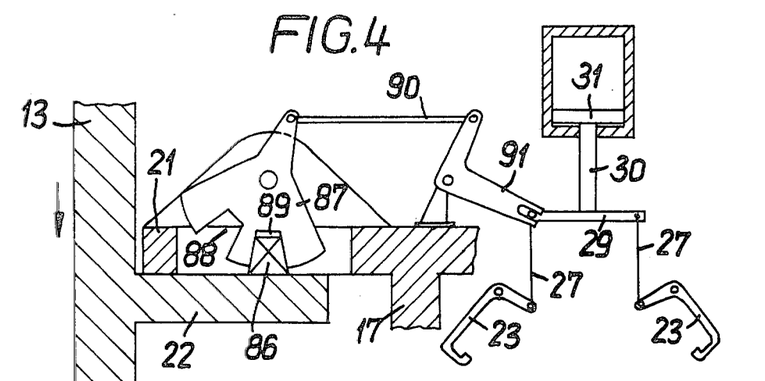
FIGS. 4, 5 and 6 diagrammatically illustrate a latching device in different positions respectively.

According to FIG. 4, it is assumed that the gripper housing 17 is to be placed upon a fuel element head 36. In such an instance the collar 21 rests still on the strips 22 of the gripper body 13 which is moved downwardly. The gripper pawls 23 are spread so that they can extend beyond the coupling extensions of the fuel element gripper head 36 which coupling extensions comprise the recesses 35. Accordingly, the piston 31 of the pertaining power operable device is moved into its lower end position. This is in automatic conformity with the rotary position of sector 87 illustrated in FIG. 4, according to which the locking member 86 engages the ratchet 89. Consequently, the actuating linkage for the gripper pawls 23 is blocked. According to FIG. 5, the gripper housing has been placed upon the fuel element heads according to FIGS. 1 and 2. Accordingly, the gripper body has moved over a portion of the coast stroke N so that the strip 22 has moved from the collar 21 downwardly by the distance n. Consequently, the locking member 86 has moved out of the ratchet 89. Therefore, the linkage for actuating the gripper pawls 23 is no longer blocked. These pawls 23 are therefore by movement of the piston 31 in upward direction moved into the closing position of FIGS. 1 and 2 whereby the fuel element head 36 is coupled to the gripper housing 17. This automatically corresponds to the rotary position of sector 87 shown in FIG. 5 in which position the ratchet 82 is located opposite the locking member 86.

Figure 5:
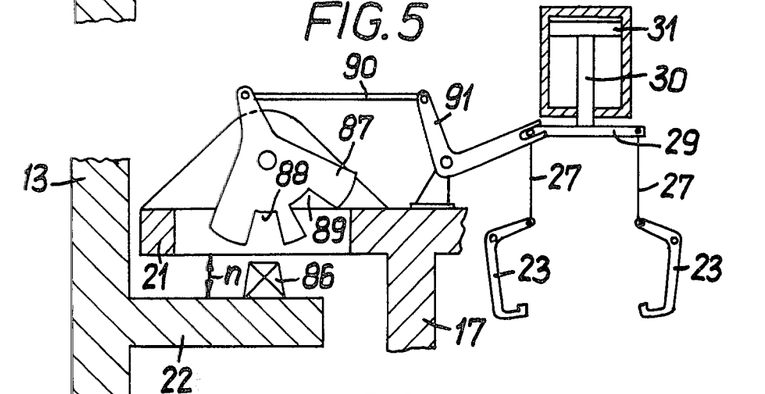

If now in conformity with FIG. 5 the gripper body 13 is lifted until the strips 22 engage the collector 21, the locking member 86 engages the ratchet 88. As a result thereof, the sector 87 is held in its position, and consequently will be able due to the positive connection between the sector 87 and the traverse 29 cannot be moved. In this way the coupling connection between the gripper housing and the fuel element suspended thereon is assured. Only when the fuel element pulled out of its holding means has been placed into another holding means while the gripper housing is placed upon the burner element head and while the gripper body 13 coasts further downwardly, the locking will be eliminated because the locking member 86 leaves the ratchet 88. Then the piston 31 can be moved downwardly so that the gripper pawls 23 are pivoted into the disengaging position according to FIG. 3.

It is a matter of course that the positive connection between the pivotable part of the locking device and any desired part of the linkage serving for actuating the gripper pawls 23 may be realized in various other ways.

When the rods 49 are to be pulled out from the fuel element in fitting 85, the gripper housing is in the above described manner with its fingers 42 placed upon the fuel element head. The gripper pawls 23 will be in the opening position shown in FIG. 3. Thereupon the piston 54 of the power operable device pertaining to the rod gripper is by means of compressed air from conduit 60 and with the aid of spring 58 moved downwardly into the position shown in FIG. 3. In this connection, the guiding rod 53 will with its cylinder surface located above the annular groove 52 move behind the radial bars containing the supporting balls 50 so that the said balls will be pressed into the annular groove 51 of the sleeve 47.

This condition is indicated on the control panel by the cam piston 63, the limit feeler 64 and the cable 41 with the downward movement of the buiding bar 53; the piston 70 is against the thrust of spring 78 moved into the lower end position illustrated in FIG. 3 which is limited by the bolt 75. The annular groove 73 moves behind the bores of pivot 67 which bores contain the supporting balls 76. Since in view of this fact, the supporting balls 76 have moved out of the annular groove 77 of the sleeve 69 mounted on the fuel element head 36, the coupling connection between the rod head 48 and the fuel element head 36 is disengaged. This condition is indicated on the operator's stand by the feeler pin 79, which due to the pressure of the spring 84 followed the downward movement of the piston 70, through the intervention of the cam piston 82, the limit feeler 83, and the cable 41.

The rods 49 can now be pulled out of the fuel element as is illustrated in its initial phase in FIG. 3.

Figure 6:
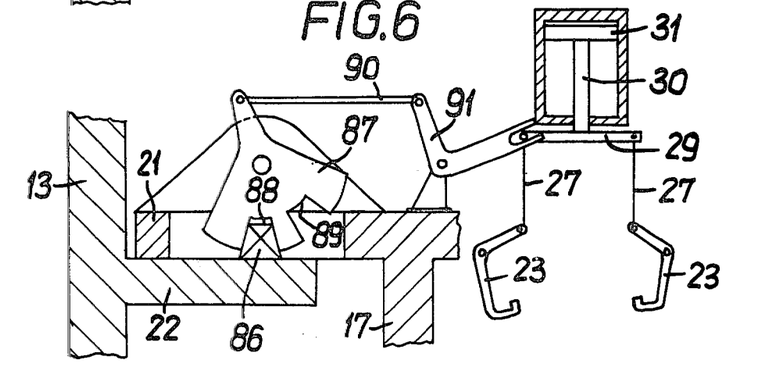

In order to assure the coupling connection between the rod head 48 suspended on the gripper housing 17 on one hand and on the housing 17 on the other hand, a locking device is provided, preferably on the same type as illustrated in FIGS. 4–6. A sector of the locking device which sector is correspondingly provided with ratchets is by a linkage positively coupled for instance to the rod 55 or to another structural element taking part in the movement of the piston 54. Also in this instance the locking will be effected when during the lifting of the gripper body 13 a strip 22 rests from below against the collar 21 of the gripper housing, and thus the locking member 36 engages the respective ratchet of the sectors.

Of course the locking device may suitable also be designed in a different way for instance in a kinematic reversal between the ratchets and the locking member. It is also within the scope of the present invention if the coasting movement of the gripper body relative to the gripper housing is in any other manner effected in such a way that after the gripper housing has been placed upon the fuel element head, a support of any suitable type of the gripper body moves from a counterbearing of the gripper housing in downward direction.

It is important that if, for instance according to FIGS. 1 and 2 a fuel element has been deposited in an insert while the gripper housing 17 with its fingers 42 is seated on the fuel element head 36, without delay rods 49 can be pulled out of the fuel element head 36. It will be appreciated that when placing the fuel element into the fitting 85, the coupling pivot 46 has already entered the bores of the sleeve 47 while the supporting balls 50 are located already opposite the annular groove 51 of sleeve 47. Thus, it is now merely necessary that the piston 54 of this power operable device pertaining to the rod gripper moves downwardly and that the piston 31 of the power operable device pertaining to the fuel element gripper is moved downwardly for spreading the gripper pawls 23.

The guiding mast 2 can, depending on the requirements, be rotated about its axis 4 while the gripper body 1 and the gripper housing 17 are likewise turned automatically, This is effected for instance for purposes of inspecting fuel elements or rods mounted on the gripper housing or of the rods which are suspended on the rod head provided on the gripper housing. Furthermore, a corresponding rotary movement may be effected in order to rotate a group of rods about a certain angle after said rods have been pulled out from a fuel element and to place the rods in the annular position into the bores of the fuel element. In this connection it is favorable if the winch is introduced by the rotation of the gripper body.

It is, of course, to be understood that the present invention is by no means limited to the specific showing in the drawings but also comprises any mocifications within the scope of the appended claims.

Figures 7, 8, 9:
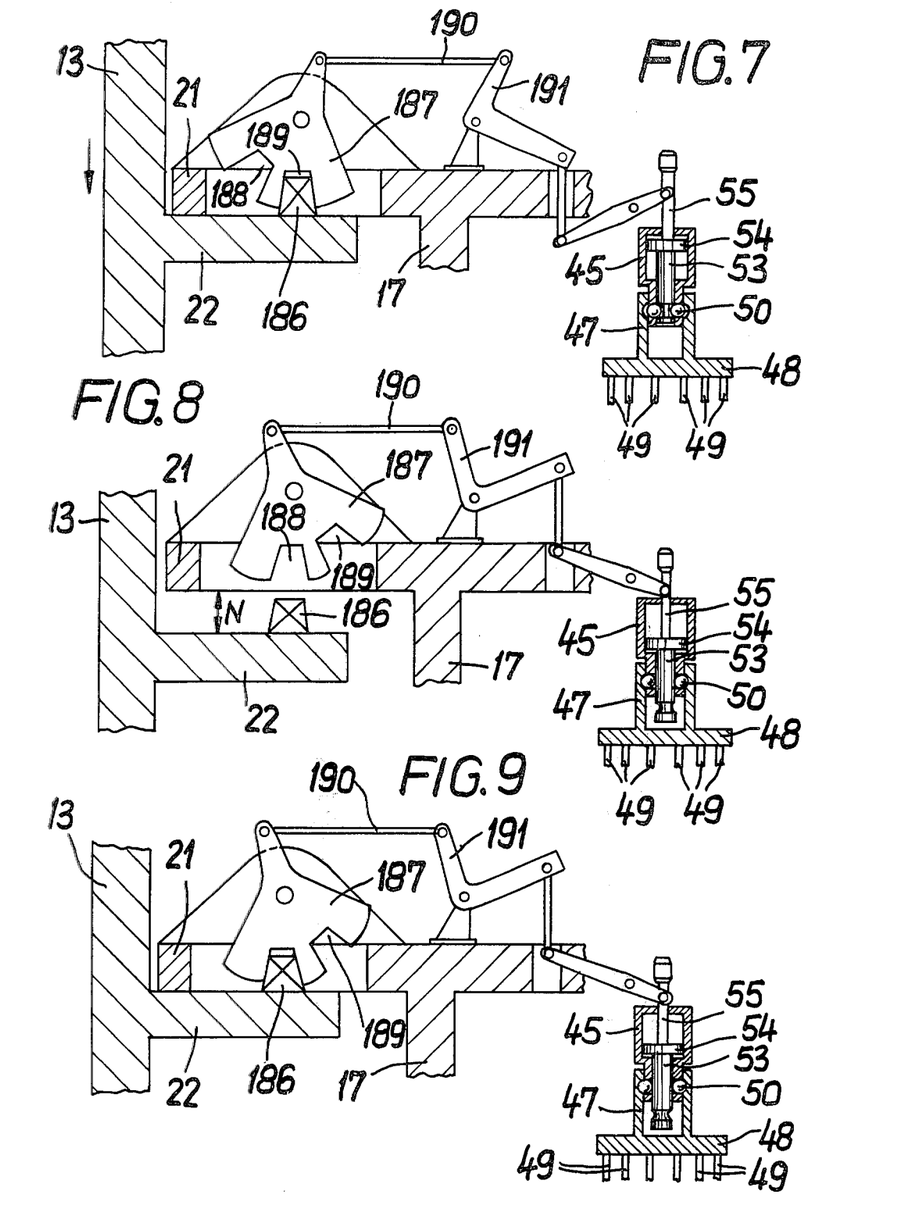
FIGS. 7, 8 and 9 diagrammatically illustrate another latching device in different positions respectively.

FIGS. 7, 8 and 9 show that a locking element and a locking member shown in FIGS. 4, 5 and 6 may be used for locking the gripper means 47, 53 pertaining to the rod means 48, 49. In FIGS. 7, 8, and 9 portions 186 and 191 are similar to portions 86 to 91 respectively in FIGS. 4, 5 and 6.

What is claimed is:

1. In combination with a gripping and lifting device, for the fuel elements and rod means in a core reactor; a carriage, a winch drum on the carriage, a support member beneath the carriage and cable means suspending the support member from the winch drum, a gripper body having at its upper end an inwardly protruding first abutment which can rest upon said support member and having a lower situated inwardly protruding second abutment, a gripper housing reciprocable within said gripper body having a third abutment which can rest upon said second abutment and having at its lower end a first gripper means for engagement with rod means and a second gripper means for engagement with a fuel element, the rod means being insertable in the fuel element and removable completely independently from the fuel element, a first power operable means arranged within said gripper housing and attached to said gripper housing for actuating said first gripper means, a second power operable means attached to said gripper housing at a higher level than said first power operable means for actuating said second gripper means, locking means for locking said first and second gripper means in gripping positions.

2. In a gripping and lifting device, especially for the fuel elements and rod means in a core reactor; a carriage, a winch drum on the carriage, a support member beneath the carriage and cable means suspending the support member from the winch drum, a gripper body supported by said support member and dependent therefrom, a gripper housing in said body and having first and second gripper means at the bottom for engagement with rod means and a fuel element respectively, said housing being provided with first and second power operable means arranged one above the other for actuating said first and second gripper means respectively between gripping and release positions, locking means for locking said means in gripping position, said housing being reciprocable in said body, cooperating elements of abutment means on said body and housing for limiting the downward movement of the housing in the body, the power operable means for said first gripper means comprising a first cylinder and a first piston in said housing, a first separable ball coupling between said rod means and said first gripper means, a second separable ball coupling between said rod means and said fuel element, a first guiding rod extending downwards from said first piston and forming an actuator for said first separable ball coupling, a first spring means which may urge said first piston downwards into a first position for locking said first separable ball coupling means, a second guiding rod arranged below said first guiding rod and forming an actuator for the second separable ball coupling, and a second spring means which may urge said second guiding rod upwards into a first position for locking said second second separable ball coupling, said first guiding rod in its first position holding said second guiding rod in a second position for releasing said second separable ball coupling, said first piston may be urged by a fluid supplied into the lower portion of said first cylinder upwards into a second position for releasing said first separable ball coupling.

3. A device in combination to claim 2 which includes a mast dependent from said carriage and reciprocably receiving said gripper body, said winch drum being horizontally disposed on said carriage and being nonrotatable in the horizontal plane of the axis thereon, and bearing means rotatably supporting said gripper body on said support member.

4. A device according to claim 2 in which said first piston has a rod connected thereto and extending axially from said first cylinder upwards, cam means on said rod, and switch means stationary relative to said cylinder and actuated by said cam as said first piston moves in said first cylinder.

5. A device according to claim 4 which includes a feeler pin extending axially and reciprocably through said upwards extending rod, through said first piston and through said first guiding rod and at the lower end being engageable by the actuator for said second ball coupling, a third spring biasing said pin downwards toward said actuator for said second ball coupling, a cam on the upper end of said pin, and switch means operated by said cam in response to axial movement of said pin.

6. A device according to claim 2 in which said second power operable means for said second gripper means comprises a second cylinder and a second piston therein arranged above said first power operable means, a crosshead connected to said second piston, rods connected to said crosshead and extending to said second gripper means which comprises a pair of pivotally supported angle levers having said rods connected to the one end and adapted for engaging said fuel element at the other end, a cam actuated by said second piston, and switch means operated by said cam in response to movement of said second piston in said second cylinder.

7. A device according to claim 6 which includes a lock member moveably mounted on said gripper housing and connected to said crosshead for movement thereby, a lock element on said gripper body operable to engage and lock said locking member in a first position in which said second gripper means is released and in a second position in which said second gripper means is engaged, said lock element and lock member being engageable and disengageable in response to relative axial movement between said gripper body and said gripper housing.

8. A device according to claim 7 in which said lock element is moved into locking engagement with said locking member when said cooperating elements of abutment means are engaged.

9. A device according to claim 2 which includes a lock member moveably mounted on said gripper housing and connected to a member fixedly connected to said first piston for movement thereby, a lock element on said gripper body operable to engage and lock said locking member in a first position in which said first gripper means is released and in a second position in which said first gripper means is engaged, said lock element and lock member being engageable and disengageable in response to relative axial movement between said gripper body and said gripper housing.

10. A device according to claim 9 in which said lock element is moved into locking engagement with said locking member when said cooperating elements of abutment means are engaged.

* * * * *